United States Patent
Castro et al.

(10) Patent No.: US 8,758,894 B2
(45) Date of Patent: Jun. 24, 2014

(54) FOG AND ABRASION RESISTANT HARDCOAT FOR PLASTICS HAVING HYDROPHILIC SURFACTANT RICH SURFACE PORTION WITH SURFACTANT CONCENTRATION GRADIENT

(75) Inventors: Stephanie Castro, Westlake, OH (US); Brandon S. True, Parma, OH (US); Mocherla K. K. Rao, Hudson, OH (US)

(73) Assignee: Nanofilm, Ltd., Valley View, OH (US)

( * ) Notice: Subject to any disclaimer, the term of this patent is extended or adjusted under 35 U.S.C. 154(b) by 342 days.

(21) Appl. No.: 13/065,685

(22) Filed: Mar. 28, 2011

(65) Prior Publication Data

US 2011/0250442 A1  Oct. 13, 2011

Related U.S. Application Data

(60) Provisional application No. 61/342,142, filed on Apr. 9, 2010.

(51) Int. Cl.
*B32B 17/10* (2006.01)

(52) U.S. Cl.
USPC ........... 428/339; 428/323; 428/325; 428/328; 428/329; 428/332; 428/336; 428/338; 427/384; 427/385.5; 427/397.7

(58) Field of Classification Search
USPC ......... 428/323, 325, 328, 329, 332, 336, 338, 428/339; 427/384, 385.5, 397.7
See application file for complete search history.

(56) References Cited

U.S. PATENT DOCUMENTS

| | | | |
|---|---|---|---|
| 4,026,826 A | 5/1977 | Yoshida et al. | |
| 4,348,462 A | 9/1982 | Chung | |
| 4,486,504 A | 12/1984 | Chung | |
| 4,547,397 A | 10/1985 | Burzynski et al. | |
| 5,030,280 A | 7/1991 | Hoefer et al. | |
| 5,578,378 A | 11/1996 | Kruger et al. | |
| 5,804,612 A | 9/1998 | Song et al. | |
| 5,877,254 A | 3/1999 | La Casse et al. | |
| 5,958,598 A | 9/1999 | Khudyakov et al. | |
| 6,696,143 B1 * | 2/2004 | La Point | 428/216 |
| 2004/0137155 A1 | 7/2004 | Bernheim et al. | |
| 2004/0247899 A1 | 12/2004 | Bier et al. | |
| 2005/0233135 A1 * | 10/2005 | Iyer et al. | 428/331 |
| 2007/0077399 A1 | 4/2007 | Borowiec et al. | |
| 2008/0118658 A1 | 5/2008 | Kato et al. | |
| 2008/0207797 A1 | 8/2008 | Takahashi et al. | |
| 2009/0017306 A1 | 1/2009 | Hildenbrand et al. | |
| 2009/0191373 A1 | 7/2009 | Okazaki et al. | |
| 2010/0028694 A1 | 2/2010 | Zhang et al. | |

FOREIGN PATENT DOCUMENTS

EP    1845141 A1 * 10/2007

* cited by examiner

*Primary Examiner* — Callie Shosho
*Assistant Examiner* — Nicholas Kokkinos
(74) *Attorney, Agent, or Firm* — Hudak, Shunk & Farine Co. LPA

(57) ABSTRACT

A transparent laminate comprises an optically clear, cured coating layer including abrasion-resistant nanoparticles, and one or more monomers and/or one or more oligomers that are reacted in the presence of an ultraviolet light photoinitiator. The coating layer also contains a surface portion rich in hydrophilic surfactant so that the coating layer when residing on a transparent substrate forms a laminate having good abrasion resistant properties as well as good anti-fog properties.

14 Claims, 1 Drawing Sheet

FOG AND ABRASION RESISTANT HARDCOAT FOR PLASTICS HAVING HYDROPHILIC SURFACTANT RICH SURFACE PORTION WITH SURFACTANT CONCENTRATION GRADIENT

CROSS-REFERENCE

This application claims the priority filing date of U.S. Provisional Application Ser. No. 61/342,142 filed Apr. 9, 2010, herein fully incorporated by reference.

FIELD OF THE INVENTION

The present invention relates to a composition and method of applying a optically clear, radiation curable, anti-fogging hardcoat to plastic substrates in a manner such that the abrasion resistance of the hardcoat is not compromised and the coated article does not exhibit fogging when exposed continuously to high levels of humidity. The overall composition generally comprises a mixture of acrylic monomers and oligomers and photoinitiators, nano-dimensional silica and crosslinking agents, and hydrophilic surfactants where upon application and curing, the anti-fogging nonionic surfactants are concentrated at the external portion of the anti-fogging coating.

BACKGROUND OF THE INVENTION

The use of transparent plastics for the replacement of glass windows and lenses has steadily increased in many applications from automotive (windows, headlamps and taillights) to ophthalmic lenses for vision correction and safety shielding. Transparent plastics such as polycarbonate, polymethylmethacrylate and polyurethane are lighter and more shatter resistant than glass and offer excellent transparency and low haze. However, these plastics are all much softer than glass and as such are very easily scratched under normal actions such as cleaning, wiping off dust and normal handling while in use. Over time, scratches on the surface will obscure the user's vision, eliminating the benefit of lower weight lenses.

A great deal of development has gone in to the formulation of abrasion and scratch resistant coatings for plastics over the last 20 years. For example U.S. Pat. No. 4,547,397 teaches a thermally cured sol-gel type coating for polycarbonate lenses, while U.S. Pat. No. 4,486,504 teaches an ultraviolet radiation curable silicone coating composition. The inclusion of silica colloidal nanoparticles with crosslinking alkoxysilanes is described in U.S. Pat. No. 4,348,462 as well as numerous more recent patents.

In environments where the humidity is high, or extreme temperature changes are frequent, the formation of fog on transparent surfaces is a serious issue. For example, the inside of a safety face shield such as that worn by emergency or military personnel becomes rapidly fogged by the wearer's breath during periods of physical exertion, and even in less extreme environments such as playing tennis or skiing. Vision is decreased, posing a danger to the person wearing the goggles or glasses. Fog is caused by the condensation of moisture on the surface of the lens. The moisture condenses as small beads, diffracting light and giving the appearance of haze.

Strategies to eliminate the formation of fog on lenses include coatings that work by either absorbing the moisture into the polymer matrix, or causing it to sheet out, so that the individual droplets cannot be seen. Chemistries for antifog coatings mirror those developed for abrasion resistant coatings. These range from thermally cured siloxane based or sol-gel chemistry as taught in U.S. Pat. No. 5,804,612, 2K thermally cured polyurethane coatings, as set forth in U.S. Pat. No. 5,877,254, and US applications 2004/0137155, 2007/0077399, 2008/0118658, and 2008/0207797, and radiation cured coatings as taught in U.S. Pat. No. 5,958,598, U.S. Pat. No. 5,578,378, and US application 2009/0017306. Anti-fog coatings in the prior art are not very abrasion resistant. One method for achieving a hydrophilic coating is through the use of high concentrations, for example in excess of 30-50 wt %, of hydrophilic monomers, such as polyoxyethylene di(meth)acrylates, or addition of surfactants, such as anionic or cationic surfactants, or nonionic surfactants. The pitfall of hydrophilic monomers is that in order to achieve high surface energies, the monomer must be added in very high concentrations, and they become evenly distributed throughout the coating matrix rather than concentrated at the coating surface. These monomers detrimentally affect properties such as hardness or abrasion resistance and in some cases they also do not promote adhesion with the substrate. When surfactants are used the opposite problem is observed, they concentrate at the high energy surface provided by the substrate, migrating away from the air/coating interface during curing where they are needed for permanent anti-fog effects.

In summary, there is a need for an abrasion resistant coating that has good adhesion to substrates and concentrates hydrophilic components at the air/coating interface while maintaining the high optical transparency and clarity of the substrate. Because of the natural flexibility and softness of many hydrophilic monomers, such as polyoxyethylene acrylates and methacrylates, inclusion of these monomers at high concentration degrades the mechanical durability of the coating. Because high surface tension additives are driven towards the interior of the coating (the coating/substrate interface) to minimize the total energy of the system, the inclusion of high concentrations of surfactants in a coating leads to poor adhesion without significant anti-fog effects.

SUMMARY OF THE INVENTION

An aspect of the present invention relates to a composition and a process for applying the composition as an optically clear, abrasion resistant, anti-fog coating to a transparent substrate such as a plastic. Therefore, the present invention discloses a process of applying an optically clear anti-fog coating composition in multiple steps, such as at least an initial step that provides an excellent abrasion resistant clear polymer layer while at least one subsequent step deposits concentrations of surfactants that penetrate the external portion of the coating layer. Upon curing, the coating layer contains a differential concentration of the surfactant on the external portion thereof.

More specifically, a radiation curable coating composition comprises finely divided silica, a silica crosslinking agent such as a functionalized trialkoxysilane, various acrylic monomers and oligomers, small amounts of a hydrophilic surfactant, and a photoinitiator that are applied to the surface of the substrate and partially cured with ultraviolet light. Subsequently, a solution of hydrophilic surfactants such as nonionic surfactants in an organic solvent is applied over the top of the partially cured abrasion resistant hardcoat. The solvent is allowed to evaporate, during which time the surfactants intermingle with the upper portion of the coating, and the coating is then fully cured by the radiation apparatus forming a surface portion rich in a hydrophilic surfactant.

Excess material from the second step is then removed mechanically or by solvent extraction.

The choice of the solvent carrier for the hydrophilic additives is very important. The ideal solvent not only solubilizes the surfactants, but also partially dissolves the coating, allowing the surfactants to commingle with radiation curable monomers so that during final curing of the coating, they become permanently blended and entangled near the top of the matrix. A solvent that does not partially dissolve the coating will deposit the hydrophilic additives without entangling them, and they will be easily washed away and thus does not provide an anti-fog surface.

It is also important that the coating surface be only partially cured during the first step. If the abrasion resistant coating formulation is cured too much, the monomers are not extracted by the solvent and the hydrophilic additives cannot become entrapped in the matrix. If the abrasion resistant formulation is not cured enough, the coating will not have the structural stability to withstand the application of a second step, resulting in physical defects in the coating after curing. The above process provides flexibility during scale-up and manufacturing with regards to the process speed and degree of interpenetration of the hydrophilic additives with the UV-curable monomers.

The present invention relates to a transparent laminate, comprising: an optically clear, cured coating layer residing on a transparent substrate; said optically clear coating layer comprising an optically clear polymer layer derived from abrasion-resistant nanoparticles, a crosslinking agent, a hydrophilic surfactant, one or more monomers, and optionally one or more oligomers, in the presence of at least one ultraviolet light photo initiator; and said optically clear coating comprising a surface portion rich in a hydrophilic surfactant.

The present invention also relates to a process for forming a transparent laminate, comprising the steps of: forming a partially cured optically clear polymer coating layer on a transparent substrate, said partially cured layer derived from polymerizing a coating layer composition comprising abrasion-resistant nanoparticles, a crosslinking agent, a hydrophilic surfactant, one or more monomers, one or more oligomers, and at least one photoinitiator; subsequently adding a hydrophilic surfactant in a solvent to the surface of said partially cured optically clear polymer coating layer and intermingling said hydrophilic surfactant into the surface portion of said optically clear polymer layer and forming a surface portion rich in said hydrophilic surfactant; and curing said polymer coating layer containing said added hydrophilic surfactant.

The present invention also relates to an optically clear coating composition comprising abrasion-resistant nanoparticles, a crosslinking agent, a hydrophobic surfactant, one or more monomers, a photoinitiator, and optionally one or more oligomers.

BRIEF DESCRIPTION OF THE DRAWINGS

The drawings herein are representative of laminates of the present invention and are set forth with respect to purposes of illustration and do not limit the invention thereto.

DETAILED DESCRIPTION OF THE INVENTION

Figure 1:
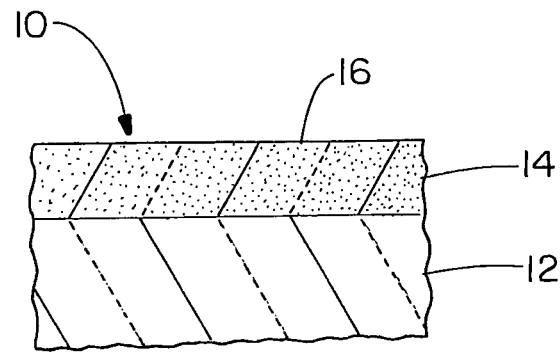
FIG. 1 is a cross-sectional elevational view of the transparent laminate of the present invention wherein a transparent, fog-resistant, abrasion-resistant coating is located on a substrate.

The optically clear coatings of the present invention are applied to various transparent substrates such as flexible transparent elastomers, e.g. various clear silicones and transparent plastics, especially thermoplastics such as polycarbonates; polyacrylates; polymethylmethacrylates; polystyrenes and copolymers thereof such as styrene acrylonitrile copolymers; polyolefins such as polyethylene, polypropylene, syndiotactic crystalline polypropylene; polyesters such as polyethylene terephthalate and polybutylene terephthalate; polyamides such as nylon; polyimides; polyurethanes; and the various copolymers thereof; and any combination thereof. For purposes of definition, any transparent polymeric material that is thermoplastic and possesses an ASTM D1003 haze value of less than about 2.0% and desirably less than about 1.5% through an optical path of 5 mm is defined as a transparent thermoplastic. The same standard applies with respect to the substrate. Preferred plastics include polycarbonate and polycarbonate copolymers, polymethylmethacrylate and polyacrylate copolymers, and polyurethane and polyurethane co-polymers. The thickness of the substrate can vary greatly depending upon its use and application such as from about 1 or about 10 to about 2,000 or about 1,000 mils. Various glass substrates are excluded from the present invention due to lack of good adhesion of the coatings of the present invention to the glass. In other words, the substrates are free of glass.

A multi-step process is generally utilized wherein in one or more steps, various monomers and/or oligomers, photoinitiators, abrasion-resistant compounds, and crosslinking agents, and very small amounts of a hydrophilic surfactant are mixed and blended together to form a coating composition. Desirably, the abrasion-resistant compounds that are preferably nanoparticles are reacted with the crosslinking agents to graft the same onto the abrasive compounds and then subsequently blended with the oligomer/monomers, photoinitiators, and -hydrophilic surfactants. The coating composition can then be applied to the surface of the substrate and partially reacted or cured in an ultraviolet (UV) apparatus. In another or subsequent step, e.g. hydrophilic application(s), various hydrophilic surfactants are dissolved in a solvent and mixed or blended and then applied to the surface of the partially cured coating whereby they intermingle or penetrate the surface of the coating. After evaporation of the solvent, the partially cured coating located on the substrate is returned to the UV apparatus and fully cured.

Monomers of the coating formulation include various difunctional acrylates or methacrylates of the general formula $(CH_2=C(R)-COOR'-OOC-(R)C=CH_2)$, where R, independently, is a hydrogen or methyl group, and R' is a linking group that can be an alkyl group of 1 to 10 carbon atoms, or a polyoxyethylene group of 1 to 6 units, or a phenyl group, or cyclohexane group. Acrylate and/or methacrylate esters (abbreviated (meth)acrylate) or derivatives thereof that are particularly useful in the invention include, but are not limited to: 1,6-hexanedioldi(meth)acrylate, 1,4-butanedioldi(meth)acrylate, cyclohexane dimethanol di(meth)acrylate, diethylene glycol di(meth)acrylate, triethylene glycol di(meth)acrylate, tetraethylene glycol di(meth)acrylate, tripropylene glycol di(meth)acrylate, and so forth. It is preferred to use the shorter oxyethylene chain diacrylates based on their low viscosity and fast cure rates as well as their good adhesion to substrates such as polycarbonate. In the present invention, a low viscosity is desirable, preferably below about 50 cps and most preferably below about 40 cps to about 5 cps without the addition of volatile solvents. This low viscosity allows a greater range of application options such as spraying and flow coating than can be achieved with a high viscosity formulation. However, higher viscosities can be desirable such as 50-200 cps for other application options such as screen printing and gravure printing. The viscosity of the formulation can be adjusted through the use of rheology modifiers or adjustment of the oligomer/monomer ratio.

Oligomers of the coating formulation that have from about 4 to about 100 and desirably from about 10 to about 50 repeat units can optionally be used with the above-noted various monomers and are highly useful for enhancing the mechanical durability of the cured coating. Because oligomers tend to have very high viscosities, they constitute only a minority component of the formulation. That is, based upon 100 total parts by weight of one or more different types of monomers that form optically clear polymers, the amount of the one or more different types of oligomers when utilized are generally from about 10 to about 40, desirably from about 15 to about 35 and preferably from about 20 to about 30 parts by weight. Examples of suitable oligomers include aliphatic urethane acrylates such as those produced by the Sartomer Company (Exton, Pa.), including, but not limited to: CN929, CN959, CN962, CN963, CN980, CN981, and CN996, or aliphatic oligomers such as CN132, CN133, CN137, or polyester acrylate oligomers such as CN292, CN293, CN750, CN2200. Other suitable oligomers include those produced by the Rahn Company, such as epoxy acrylates Genomer 2235, Genomer 2263, and Genomer 2280; polyester and polyether acrylates such as Genomer 3364, Genomer 3414 and Genomer 3485, and urethane acrylate Genomer 4425. It will be appreciated by those skilled in the art that a wide variety of specialty oligomers available from several suppliers can be suitable so long as the backbone chemistry is similar to those described above and the oligomer is a multifunctional acrylate with a functionality of 2 or higher, ideally between 2 and 6 acrylate units per oligomer molecule. It is appreciated by those skilled in the art that a formulation containing a plurality of oligomers and a reactive diluent may have enhanced mechanical properties compared to a formulation comprising only one oligomer and a reactive diluent.

The various monomers and oligomers that form optically clear polymer coating compositions can be polymerized and cured, i.e. crosslinked, by radiation, for example ultraviolet light, by utilizing photoinitiators that generate free radicals. Examples of highly active photoinitiators include benzophenone and its derivatives, benzyl, thioxanthones and their derivatives, ketones such as hydroxycyclohexylphenylketone and the like. Particularly preferred for this invention are benzophenone and its derivatives and hydroxycyclohexylphenylketone. These and other suitable photoinitiators are well known to the art and to the literature. The amount of the one or more photoinitiators is generally from about 1 to about 10, desirably from about 2 to about 8, and preferably from about 3 to about 6 parts by weight for every 100 total parts by weight of the one or more monomers and the one or more oligomers that form the optically clear polymers.

An important aspect of the coating formulation of the present invention is the utilization of one or more abrasion-resistant nanoparticles so that the optically clear polymer coating has good scratch and mar resistance. Examples of such particles include finely-divided or colloidal silica nanoparticles, alumina nanoparticles, zirconium oxide nanoparticles, zinc oxide nanoparticles, antimony oxide nanoparticles, and the like with silica being preferred. The average particle diameter of such particles is very small such as generally from about 5 to about 40 nanometers, desirably from about 10 to about 30 nanometers, and preferably from about 10 to about 20 nanometers. Examples of commercially available silica nanoparticles include Nalco 1034A, Nalco 2327 from Nalco (Naperville Ill.), Ludox SK, Ludox TMA, Ludox HS30 and Ludox HS40 from W.R. Grace Co., Columbia Md. Examples of commercially available alumina nanoparticles are Nanobyk 3600 (BYK Chemie, Altana Group, Wesel Germany) and Nyacol AL-20 (Nyacol NanoTechnologies, Ashland Mass.). Such particles generally have a Mohs hardness of about 6.0 and greater and desirably about 7.0 or greater. These nanoparticles are typically dispersed in an aqueous suspension at a concentration of 10-40 wt %. The concentration of the nanoparticles in the final optically clear polymer coating is about 1 to about 20, desirably from about 3 to about 15, and preferably from about 5 to about 10 parts by weight for every 100 total parts by weight of all monomers and oligomers. The addition of high concentrations of nanoparticles has a direct effect on the scratch resistance of the coating but at the same time is directly proportional to the viscosity of the final coating liquid. A balance between properties is determined by the coating process parameters and thus allowable viscosity and the desired level of scratch resistance.

It is desirable to crosslink the various abrasion-resistant nanoparticles because they are typically supplied as a colloidal dispersion in an aqueous medium and are not compatible with the organic monomers and oligomers. By grafting a crosslinking agent to the surface, the nanoparticles present an organically compatible surface that can form covalent bonds with the polymer matrix, derived from the monomers and oligomers, during UV-curing, thus enhancing the abrasion resistance of the coating. Often it is desirable to graft a crosslinking agent to the surface of the nanoparticles and then add the same to the coating composition comprising the monomers, oligomers, hydrophilic surfactants and ultraviolet light photoinitiators. Suitable nanoparticle crosslinking agents include various trialkoxysilanes of the formulation $R^2Si(OR)_3$, where R is a lower alkane of 1 to 4 carbon atoms, and $R^2$ is an organic functional group which is compatible with the various monomers and oligomers. Examples of $R^2$ include but are not limited to methacryloxypropyl, vinyl, isobutyl, ethyl, aminopropyl, glycidoxypropyl, and any other group which can provide solubility of the nanoparticles in the various monomers and oligomers in the absence of water. The nanoparticle crosslinking agents are present in an amount proportional to the total amount of the various abrasion-resistant compounds in an amount generally from about 5 to about 50, desirably from about 10 to about 30, and preferably from about 15 to about 25 parts by weight for every 100 total parts by weight of all abrasion resistant compounds. The silane crosslinking agents are grafted generally at a temperature of from about 30° C. to about 90° C. and desirably from about 50° C. to about 75° C. to the surface of the silica nanoparticles through a condensation reaction between the hydroxyl groups on the silica surface and the alkoxy groups on the silane. The condensation leads to the formation of a covalent Si—O—Si linkage between the silica and silane with the production of one unit of alcohol for each alkoxy group present.

An important additive of the coating composition to be partially cured is the utilization of various hydrophilic surfactants in low concentrations such as from about 0.01 to about 3, desirably from about 0.03 to about 0.5, and preferably from about 0.05 to about 0.3 parts by weight per 100 parts by weight of all of said monomers and oligomers. Of the various hydrophilic surfactants, nonionic surfactants are preferred and many classes thereof can be used, for example but not limited to, polyethylene glycol also known as polyethylene oxide, polypropylene oxide, polyoxyethylene trisiloxanes such as those sold under the Silwet brand name, or copolymers or block copolymers of polyethylene- and polypropylene oxides such as are sold under the Pluronic brand name made by BASF of Ludwigshafen, Germany. As known to those skilled in the art, is to be understood that the various noted nonionic surfactants also include derivatives thereof, alkyl ether derivatives of polyethylene oxide, and/or aromatic or alkyl substituted aromatic ethers as well as siloxane modified nonionic surfactants, also referred to as organomodified siloxane. Other hydrophilic surfactants that can be utilized within the coating formulation are those set forth herein below with regard to coating the partially cured anti-fog, abrasion resistant coating with a hydrophilic layer. Although the nonionic surfactants are present in very low amounts and do not have a direct effect on the hydrophilicity of the coating composition as evidenced by the water contact angle, its presence is believed to allow the intermingling and grafting together of hydrophilic surfactant molecules in a subsequent application step, giving a uniform coating with anti-fog properties.

Once thoroughly mixed by methods well known to those skilled in the art, such as stirring with a magnetic stirrer, overhead mixer, blade mixer or the like or any other commercially practiced agitation or mixing equipment, the coating composition of the various initial steps is laid upon the substrate by any method that used to create a thin, uniform liquid coating. For example, rod-drawing, flow-coating, dipping, spraying, doctor-blading, screen printing and gravure printing are all non-limiting, acceptable methods. The liquid coating composition is then passed through a radiation beam, such as a Fusion UV curing apparatus, only enough times to partially cure the coating and to secure the layer to the substrate. At this stage, the top surface of the coating is not tacky or wet to the touch, but can be easily damaged by the application of pressure, for example by a finger or mixing spatula.

Unexpectedly it has been found that the coating must be only partially cured in order for the durable anti-fog properties to be realized. If the coating is cured too much, a subsequent hydrophilic application step will not blend with the first step and the anti-fog properties are easily wiped away. If the coating is not cured enough, and the surface is still wet, the subsequent step will dissolve the first step coating and ruin the physical appearance and optical properties thereof. Additionally, the hydrophilic components of the subsequent step will become thoroughly dissolved in the components of the first step, resulting in poor anti-fog properties, much as if the hydrophilic components were blended into the components of the initial step(s). Also, the abrasion resistance will be unacceptable. A suitable test to determine whether the upper portion of the coating is partially cured is a pencil hardness test according to ASTM D3363 such as a value of about 3B or less (softer), desirably a value of about 5B or less, more desirably a value of about 7B or less and preferably a value of 8B or less. From softest to hardest, the ratings of the Pencil Hardness test are: 9B, 8B, 7B, 6B, 5B, 4B, 3B, 2B, B, HB, F, H, 2H, 3H, 4H, 5H, 6H, 7H, 8H, and 9H.

Subsequently in order to impart anti-fog properties to the coating, the noted subsequent hydrophilic step(s) involves forming a mixture of hydrophilic surfactants diluted in one or more organic solvents and applying the same to the partially cured coating as by spraying, flow coating, or dipping the object into the mixture. The mixture comprises one or more nonionic surfactants, alone or in combination, in a total concentration of from about 5 to about 40%, desirably about 10 to about 30%, and preferably about 15 to about 25% by weight based upon the total weight of the surfactant and the organic solvent. Such nonionic surfactants that are applied to the partially cured coating formulation can be the same or different as those set forth hereinabove with regard to the hydrophilic surfactants that are contained within the coating formulation, as well as the following hydrophilic surfactants. For example, the nonionic surfactants can be any of the commercially available surfactants sold under the trademarks Brij, Pluronic, Igepal, Silwet or Tween. Brij is the trademarked name of oligoethylene glycol-n-alkyl ether held by Croda (NewCastle, Del.) and describes a family of nonionic surfactants with the formula $CH_3(CH_2)_n(OCH_2CH_2)_mOH$, where n=10-20 and m=5-100. Pluronic is the trademarked name of block-polyethylene oxide/polypropylene oxide/polyethylene oxide of the general formula $HO(CH_2CH_2O)_x(CH_2CH(CH_3)O)_y(CH_2CH_2O)_zH$, where x, y and z, independently, are 2-100. The Pluronic name is held by BASF of Ludwigshafen Germany. Igepal is the trademarked name of polyoxyethylene isooctyl phenyl ether and polyoxyethylene nonylphenyl ether, held by Rodia. Silwet is the trademarked name held by Momentive Performance Chemicals (Wilton, Conn.) of the organomodified siloxane $(CH_3)_3Si-O-Si(CH_3)(OCH_2CH_2)_xOH)-O-Si(CH_3)_3$ where x=6-9. Tween is a trademark of ICI Americas (Wilmington, Del.) and describes a family of polyoxyethylenesorbitan fatty acid esters. It will be appreciated by those skilled in the art that these nonionic surfactants may be manufactured by a number of chemical suppliers and that the company of origin in no way restricts the use of the surfactant in the formulation so long as the general structural formula is adhered to.

The organic solvent used as a carrier must satisfy two conditions. First, the surfactant or combination of surfactants must by soluble in the solvent. Second, the solvent must be able to extract one or more components of the first step, such as monomers or oligomers and reactive diluents when it is applied to the surface of the partially polymerized coating. By partially dissolving the coating, some monomers and/or oligomers (most likely just monomers) are extracted into the pool of solvent, where they mix with the surfactants. As the solvent evaporates, the mixture settles down on the surface (interpenetrating the monomers and surfactants) and is cured in place. Suitable organic solvents include various aromatic hydrocarbons such as benzene, various xylenes, toluene, mesitylene, and the like.

After covering the substrate with the solution in one or more steps, the volatile solvents are allowed to evaporate and the coated substrate is returned to the UV radiation apparatus to complete curing of the coating. That is the monomers and oligomers are polymerized and crosslinked along with the grafted abrasion resistant particles. At this time the coating is fully cured and hard to the touch. Excess material from the subsequent step can be removed either by wiping away with a soft cloth or by cleaning away with a gentle cleaner, such as a lens cleaner.

Figure 2:
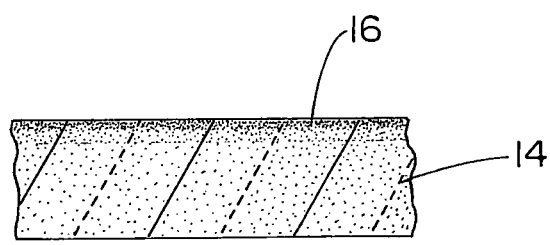
FIG. 2 is a cross-sectional elevational view showing an enlarged portion of the external portion of the coating of FIG. 1 having a nonionic surfactant surface rich portion.

Laminate 10 of the present invention as shown in FIG. 1 comprises substrate 12 that has fog and abrasion resistant hardcoating 14 adhered thereto. The total thickness of the fully cured coating is generally from about 3 to about 25 microns and desirably from about 5 to about 10 microns, although this can be adjusted if desired during the one or more initial steps by application of more or less UV curable compounds. An external portion of coating 14, as better seen in FIG. 2, has a surface portion 16 rich in molecules of the hydrophilic surfactant. The surface rich portion of the coating has a concentration gradient of the hydrophilic surfactant that was added during the subsequent one or more hydrophilic surfactant application steps. That is, the co-mingling or interpenetration of the surfactant with the one or more optically clear polymers and/or oligomers and the abrasion resistant compounds results in a surfactant gradient having a thickness of generally only from about 0.5 to about 3 microns and desirably from about 0.5 to about 1 micron that contains at least about 80% or at least about 90% by weight of the total hydrophilic surfactant therein. As apparent from FIG. 2, the surfactant molecules are located at the external portion of coating 14 with the surfactants being progressively more concentrated going in a direction to the surface of the coating.

Without being bound by theory, it is believed that the durability of the anti-fog properties are due to the mixing of the small amount of hydrophilic surfactants with the UV polymerizable monomers and oligomers and the crosslinking abrasion resistant components of the initial step(s) and then the addition of hydrophilic surfactants, preferably nonionic, in a subsequent step, followed by a locking in place during the UV (polymerizing) curing process.

The coatings of the present invention, as noted above, are optically clear. That is, they are transparent and possess an ASTM D1003 Haze value of less than about 2% and desirably less than about 1.5% through an optical path of 5 mm.

The invention will be better understood by reference to the following examples that serve to illustrate, but not to limit the metes and bounds of the present invention.

EXPERIMENTAL

The anti-fog capabilities of the following samples are evaluated by two methods called the breath test and the percolator test. In the breath test, the sample is held approximately 1 inch in front of the mouth and the subject should exhale deeply on it and then immediately inspect for the presence of fog. A sample with no visible fog is rated "3", a sample with partial fog, and/or fog that clears very quickly is rated "2", and a sample which is completely covered with fog is rated "1". For the percolator test, the sample is placed on the opening of a custom built fog chamber. The fog chamber consists of a clear plastic container with dimensions 11 5/16"× 10.5"×14 7/16"H inches, with an interior volume of 1715 cubic inches (7.4 US liq. gal.). Four (4) circular holes two (2) inches in diameter are cut in the bottom of the box for the samples to rest on. The box is placed upside down (holes facing upwards) over a percolator (Elite Cuisine by Maxi-Matic, Coffee Percolator, Model #EC900). A temperature controller is fixed in place at the rim of the percolator and the water inside the percolator is heated until the headspace above the percolator reaches 55° C. The humidity and temperature are monitored at the height of the samples. The percolator is heated until the atmosphere inside the box reaches equilibrium at 30-40° C. and 80-90% RH. The samples are placed over the holes and the % Haze is estimated on the samples for up to 8 hours. Samples which are fog-free at 30 minutes are considered to pass the minimum requirement.

The durability upon soaking is measured by a slightly modified version of EN166/EN168, the standard method for anti-fog performance, wherein the coated object is immersed in water, dried and the anti-fog properties re-evaluated. It is found that upon immersion or rinsing with water, the initial anti-fog properties of the coating are lost. However, they can be rejuvenated again and again by cleaning the object with lens cleaner which contains surfactants. If the lenses are cleaned with lens cleaner between cycles of the EN166/EN168 test, the coating will pass the modified test. Not wishing to be bound by theory, it is believed that the components which are locked into the top layer of the coating act as "receptors" for hydrophilic surfactants, and in the process of cleaning with an appropriate cleaner, those surfactants lost in rinsing with water are restored to the surface sites.

Abrasion resistance is measured by the Gardner abrasion test (ASTM D2486) using a Niagara medium duty scrub pad with a 1 lb. weight. The number of rubs (cart moving back and forth one cycle counts as one rub) to increase the haze of the sample to >1.0% (measured on BYK Hazemeter) is recorded.

Mar resistance is measured in accordance with ASTM #D5178-98 on a Balance Beam Scrap Adhesion Mar Tester (Paul Gardner Co., Pompano Beach, Fla.) The number of grams weight required to impart a durable mark on the substrate is measured.

Example 1

147 g of Nalco 1034A silica was placed in a 500 mL round bottomed flask with 12.4 g methacryloxypropyltrimethoxysilane and 7.4 g vinyltrimethoxysilane crosslinking agents, 196 g isopropanol solvent and a magnetic stirrer. The crosslinking agents were grafted onto the silica by heating the mixture to 70° C. for 3 hours, then cooling to 50° C. 163 g Sartomer CN132, an aliphatic oligomer 17.8 g Sartomer CN981, a urethane acrylate oligomer, and 350 g Sartomer SR272, triethyleneglycol diacrylate monomer, were added and stirred for 30 minutes. The flask was placed on a rotary evaporator and the water/IPA mixture removed under reduced pressure. 50 g benzophenone photoinitiator was then dissolved in 350 g of SR272 and the solution added to the formulation in the flask.

Example 2

Control

The polymer coating formulation of Example 1 was spread on cleaned polycarbonate sheet using a #12 wire-wound rod (RDS Specialities, Webster, N.Y.) and fully cured in 8 passes on a Fusion LC6B with an F300S curing system (H bulb, 300 W/inch) at 56 fpm belt speed (Fusion UV Systems, Inc., Gaithersburg, Md.).

Example 3

Control

To 99.9 g of the polymer coating formulation of Example 1 was added and mixed 0.1 g Pluronic L62 surfactant, a triblock copolymer of (polyethylene oxide)(polypropylene oxide)(polyethylene oxide) with an approximate molecular weight of 2,500 manufactured by BASF. The coating formulation was then coated and fully cured on a polycarbonate substrate and fully cured as set forth in Example 2 (8 passes).

Example 4

Control

To 99.9 g of the polymer coating formulation of in Example 1 was added and mixed 0.1 g Pluronic L92 surfactant, a triblock copolymer of (polyethylene oxide)(polypropylene oxide)(polyethylene oxide) with an approximate molecular weight of 3,650 manufactured by BASF. The coating formulation was then coated on a polycarbonate substrate and fully cured as set forth in Example 2 (8 passes).

Example 5

The polymer coating formulation of from Example 4 containing the surfactant was coated on a polycarbonate substrate and partially cured with two passes through the Fusion. A solution of 3% Silwet L7608, 20% Pluronic L92 and 77% xylene was sprayed liberally over the partially cured panel. The xylenes were allowed to evaporate at room temperature for 30 seconds and the panel is was returned to the Fusion for 6 passes and fully cured.

The excess material from the second step is removed by wiping with a Kimwipe.

Example 6

The polymer coating formulation of Example 4 containing the surfactant was coated on a polycarbonate substrate and partially cured with two passes through the Fusion. A solution of 3% Silwet L7608, 20% Pluronic L92 and 29% isopropanol, 48% odorless mineral spirits was sprayed liberally over the partially cured panel. The solvents were allowed to evaporate at room temperature for 30 seconds and the panel was returned to the Fusion for 6 passes and fully cured.

The excess material from the second step is removed by wiping with a Kimwipe.

Example 7

The polymer coating formulation of Example 3 containing the surfactant was coated on a polycarbonate substrate and partially cured with two passes through the Fusion. A solution of 3% Silwet 7608, 20% Pluronic L62, and 77% xylene solvent was sprayed liberally over the partially cured panel. The xylenes were allowed to evaporate at room temperature for 30 seconds, and the panel was returned to the Fusion for 6 passes and fully cured.

The excess material from the second step was removed by wiping with a Kimwipe.

Example 8

The polymer coating formulation of Example 3 containing the surfactant was coated on a polycarbonate substrate and partially cured with three passes through the Fusion. A solution of 3% Silwet 7608, 20% Pluronic L62, and 77% xylene was sprayed liberally over the partially cured panel. The xylenes were allowed to evaporate at room temperature for 30 seconds, and the panel was returned to the Fusion for 6 passes and fully cured.

The excess material from the second step was removed by wiping with a Kimwipe.

Example 9

Control

The polymer coating formulation of Example 1 containing no surfactant was coated on a polycarbonate substrate and partially cured with two passes through the Fusion. A solution of 3% Silwet 7608, 20% Pluronic L62, and 77% xylene was sprayed liberally over the partially cured panel. The xylenes were allowed to evaporate at room temperature for 30 seconds, and the panel was returned to the Fusion for 6 passes and fully cured.

The excess material from the second step was removed by wiping with a Kimwipe.

Example 10

The polymer coating formulation of Example 3 containing the surfactant was coated on a polymethylmethacrylate substrate and cured with two passes through the Fusion. A solution of 3% 2-(methoxy(polyethyleneoxy)propyl)trichlorosilane (Gelest SIM6492.66), 20% Pluronic L62 and 77% xylene is was sprayed liberally over the partially cured panel. The xylenes were allowed to evaporate at room temperature for 30 seconds and the panel is was returned to the Fusion for 6 passes and fully cured.

The excess material from the second step was removed by wiping with a Kimwipe

The results of Examples 2 through 10 with respect to various physical properties is set forth in Table 1.

TABLE 1

| Example | Breath test | Percolator test | Rejuvenation of Anti-fog properties with cleaner following water immersion | Gardner (#rubs to reach haze > 1%) | Mar (g) ASTM D5178-98 | Adhesion ASTM D3359-02 |
|---|---|---|---|---|---|---|
| 2 (Control) | 1 | <5 sec. (fail) | 1 (fail) | 500+ | 50 | 5 |
| 3 (Control) | 1 | <5 sec. (fail) | 2 (fail) | 500+ | 100 | 5 |
| 4 (Control) | 1 | <5 sec. (fail) | 2 (fail) | 500+ | 50 | 5 |
| 5 | 3 | >30 min. (pass) | 3 (pass) | 375 | 3050 | 5 |
| 6 | 2 | <5 min. (fail) | 1 (fail) | 375 | 3050 | 5 |
| 7 | 3 | >30 min. (pass) | 3 (pass) | 500+ | 2950 | 5 |
| 8 | 1 | <5 sec. (fail) | 1 (fail) | 500+ | 2900 | 5 |
| 9 (Control) | 1 | <5 sec. (fail) | 1 (fail) | 500+ | 2700 | 5 |
| 10 | 3 | >30 min (pass) | 3 (pass) | 500+ | 2325 | 5 |

(Adhesion: 5 = excellent)

All Example formulations had excellent adhesion to polycarbonate substrates, with a rating of "5" following ASTM#D3359-02 cross hatch adhesion test. They also had an adhesion rating of "5" to PMMA, provided the PMMA had been warmed to 80° C. prior to coating.

Examples 2, 3, and 4 were Controls wherein Example 2 was fully cured without any hydrophilic surfactant in the coating formulation and Examples 3 and 4 were fully cured and did contain a hydrophilic surfactant in the coating formulation. Examples 5 and 6 related to the coating formulation of Example 4 that was partially cured and then subsequently had a hydrophilic surfactant sprayed thereon and then fully cured. As apparent from Table 1, Example 5 had good test results with regard to the various properties including the breath test, the rejuvenation of the anti-fog property test, and the Mar test. While Example 6 was similar to Example 5, it failed the percolator as well as the rejuvenation test because, as noted above, suitable hydrocarbon solvents must be utilized such as xylene and not an alcohol or mineral spirits. Example 7 gave good results and was similar to Example 5 except that it utilized a different hydrophilic surfactant. Example 8 was very similar to Example 7 except that instead of being partially cured with two passes through an ultraviolet light treatment, it was subjected to three passes. The additional curing produced a coating that was over-cured and thus did not allow the surfactant-solvent composition to penetrate and intermingle the surface of the coating and therefore had poor properties. Example 9 related to a Control in that the coating formulation of Example 1 while initially partially cured, and then subjected to a hydrophilic spray and then fully cured, did not have any hydrophilic surfactant in the original coating formulation and thus had poor properties. Example 10 was similar to Example 8 except that the substrate was polymethylmethacrylate instead of polycarbonate. As apparent from Example 10, good properties were also obtained.

As noted above, an important aspect of the invention is that the coating formulation be only partially cured for the subsequent surfactant application step. Over-cure will not allow the subsequently applied surfactant to adhere to the coating layer and will result in a weak and undesirable coating having poor physical properties. This fact is demonstrated by Examples 7 and 8 above wherein a double pass partial cure yielded suitable properties (Ex. 7) whereas three passes (Ex. 8) with regard to UV cure did not yield suitable properties. Further evidence of this fact is emphasized in the following Bayer Abrasion Test Method and a Pencil Hardness Test. In each test, the formulation of Example 7 was utilized.

The Bayer Abrasion Test Method (Colts Laboratories test, an adaptation of ISO CD 15259 and ASTM F735-94) was performed on panels that were coated with the coating formulation of Example 4 which were then subjected to either two passes of curing in the Fusion or three passes. In this test, a lower number indicates a harder, more abrasion resistant coating. The number reported was the amount of Haze gained by the coating as a result of the test, measured on BYK-Gardner Hazemeter in accordance with ASTM D1003-00. After 2 passes, the panel had a haze level of 17.7. After three passes, the panel had a haze level of 4-6, which was comparable to the haze level obtained after a full curing procedure of 8 passes. Thus, a significant change in the amount of crosslinking was shown to occur between 2 and 3 passes.

The Pencil Hardness test (ASTM D3363) gives an indication of the mar resistance of a coating as well as its adhesion. The panel having the coating formulation of Example 4 was cured with only 2 passes through the Fusion and had a pencil hardness of 9B (the softest rating), indicating a very soft coating and incomplete cross linking. A similar panel which had been cured with 3 passes had a pencil hardness of B, or 8 steps higher on the pencil hardness scale. A fully cured panel had a pencil hardness of HB, which was only one step higher yet.

Various polyalkylene oxides are excluded from the present invention because their low Tg values render the coating too soft and inadequate abrasion resistance. Such compounds are di- or multi-functional alkenyl compounds wherein the alkenyl functionalities of the molecule are separated by or alternatively joined by at least one divalent polyoxyalkylene moiety having the formula: $-((CX_2)_nO)_x(CX_2)_mO)_y-$ where the sum of x+y is ten or greater, n≠m, and n and m have values ranging from one to ten, preferably from one to eight, more preferably from one to seven, and most preferably from one to five where each X is independently selected from the group consisting of hydrogen, one to forty carbon atom monovalent hydrocarbon radicals and six to forty carbon atom monovalent aromatic hydrocarbon radicals, the alkenyl functionalities being joined to the divalent oxyalkylene moiety by a monovalent, divalent, or multivalent alkylene moiety whereby the alkenyl compound is rendered di-, tri-, or multi-functional in terms of olefinic unsaturation. Preferably X is hydrogen, a one to ten carbon atom monovalent hydrocarbon radical or a six to ten carbon atom monovalent aromatic radical, more preferably X is hydrogen or methyl, and most preferably X is hydrogen. The term hydrocarbon radical is defined to include, but is not limited to, for example alkyl, alkenyl, alkynyl, hydroxy-alkyl, halo-alkyl, amino-alkyl, thio-alkyl, aryl, phenyl, benzyl, pyridinyl, thiophenyl, furanyl, naphthyl, anthracenyl and other condensed ring aromatics and condensed ring heterocycles where the hetero atom may be oxygen, nitrogen, sulfur or phosphorus. In contrast, the nonionic surfactants of the present invention do not have any olefinic unsaturation (or alkenyl groups). Moreover, the corresponding components of the present invention have an x+y total that is 9 or less, desirably 7 or less, and preferably 5 or less such as about 3.

Also excluded from the present invention are compounds having at least two (meth)acryloyl groups and at least two hydroxyl groups in a molecule thereof, obtained by reacting at least two components consisting of an epoxy compound and (meth)acrylic acid. Such compounds are avoided because high concentrations of hydroxyl groups in the coating will make the coating prone to absorbing water into the bulk, thus softening it. If utilized, the amounts thereof are very small such as <5% so that the abrasion resistance of the polymer matrix is not compromised.

While it will be apparent that the preferred embodiments of the invention disclosed are represented by the prior examples, it will be appreciated that the invention is susceptible to modification, variation, and change without departing from the intended scope or fair meaning of the subjoined claims.

What is claimed is:

1. A transparent laminate, comprising:
   an optically clear, cured coating layer residing on a transparent substrate;
   said optically clear coating layer comprising an optically clear polymer layer derived from abrasion-resistant nanoparticles, a crosslinking agent, a hydrophilic surfactant, one or more monomers, and optionally one or more oligomers, in the presence of at least one ultraviolet light photo initiator; and
   said optically clear coating comprising a hydrophilic surfactant rich surface portion,
   said hydrophilic surfactant surface rich portion being achieved by adding a hydrophilic surfactant in a solvent to said optical coating layer when it is partially cured, evaporating said solvent and subsequently curing said coating layer containing said added hydrophilic surfactant; said hydrophilic surfactant rich surface portion having a surfactant concentration gradient thickness of from about 0.5 to about 3 microns and wherein the amount of said hydrophilic surfactant in said surfactant gradient is at least 80% by weight of the total hydrophilic surfactant within said optically clear, cured coating layer residing on said transparent substrate.

2. The transparent laminate of claim 1, wherein said transparent substrate is a thermoplastic;
   wherein said one or more monomers comprise acrylates or derivatives thereof;
   wherein said one or more oligomers have from about 4 to about 100 repeat units; and
   wherein said nanoparticles have a Moh hardness of about 6 or greater.

3. The transparent laminate of claim 2, wherein said one or more monomers comprise a difunctional acrylate or methacrylate having the formula $(CH_2=C(R)-COOR'-OOC-(R)C=CH_2)$, wherein each R, independently, is a hydrogen or methyl group, R' is a linking group that has an alkyl group from 1 to 10 carbon atoms, or a polyoxyethylene group of 1 to 6 units, or a phenyl group, or cyclohexane group; or an acrylate or methacrylate ester or derivatives thereof comprising 1-6-hexanedioldi(meth)acrylate, 1,4-butanedioldi(meth)acrylate, cyclohexane dimethanol di(meth)acrylate, diethylene glycol di(meth)acrylate, triethylene glycol di(meth)acrylate, tetraethylene glycol di(meth)acrylate, tripropylene glycol di(meth)acrylate; or any combination thereof;
   the coating layer including said one or more oligomers comprising an aliphatic urethane acrylate oligomer, an aliphatic oligomer, a polyester acrylate oligomer, an epoxy acrylate oligomer, or a polyether acrylate oligomer, or any combination thereof, wherein the amount of said oligomers is from about 10 to about 40 parts by weight per 100 total parts by weight of said one or more monomers; and
   wherein said hydrophilic surfactant of said coating layer and said surface rich portion, independently, comprises one or more of polyethylene oxide or polypropylene oxide or a derivative thereof, an alkyl ether, an aromatic or an alkyl substituted aromatic ether, an organo-modified siloxane, an oligoethylene glycol-n-alkyl ether, a block copolymer of polyethylene oxide and polypropylene oxide, a polyoxyethylene isooctyl phenyl ether, a polyoxyethylene nonylphenyl ether, or a polyoxyethylenesorbitan fatty acid ester, or any combination thereof.

4. The transparent laminate of claim 3, wherein said transparent substrate comprises a polycarbonate, a polyacrylate, a polymethylmethacrylate, a polystyrene or a copolymer therefor, a polyolefin including a polypropylene, or a syndiotactic crystalline polypropylene, a polyester, a polyamide, a polyimide, or a polyurethane, or a copolymer of any of the preceding, or any combination thereof;
   wherein said nanoparticle comprises alumina, zirconium oxide, zinc oxide, antimony oxide, or silica, or any combination thereof, wherein the amount of said nanoparticles is from about 1 to about 20 parts by weight for every 100 total parts by weight of said one or more monomers and said one or more oligomers;
   wherein said photoinitiator is a compound that can generate free radicals and wherein the amount thereof is from about 1 to about 10 parts per every 100 total parts by weight of said one or monomers and said one or more oligomers;
   the thickness of said optically clear, cured coating layer being from about 3 to about 25 microns.

5. The transparent laminate of claim 4, wherein said oligomers comprise said aliphatic oligomer, said aliphatic urethane acrylate oligomer, or said polyether acrylate oligomer, or any combination thereof; and
   wherein said nanoparticle is silica, wherein said crosslinking agent comprises a trialkoxysilane, and wherein the amount of said crosslinking agent is from about 5 to about 50 parts by weight for every 100 parts by weight of said silica.

6. The transparent laminate of claim 5, wherein said transparent substrate comprises said polycarbonate or a copolymer thereof, a copolymer of polymethylmethacrylate, a copolymer of polyacrylate, a polyurethane or a polyurethane copolymer, or any combination thereof;
   wherein said monomer is a triethyleneglycol diacrylate; and wherein said hydrophilic surfactant is a triblock copolymer of (polyethylene oxide)(polypropylene oxide)(polyethylene oxide); and
   wherein said hydrophilic surfactant rich surface portion has a surfactant concentration gradient thickness of from about 0.5 to about 1.0 micron and wherein the amount of said hydrophilic surfactant in said surfactant gradient is at least 90% by weight of the total hydrophilic surfactant with said optically clear, cured coating layer residing on said transparent substrate.

7. A process for forming a transparent laminate, comprising the steps of:
   forming a partially cured, optically clear polymer coating layer on a transparent substrate, said partially cured layer derived from polymerizing a coating layer composition comprising abrasion-resistant nanoparticles, a crosslinking agent, a hydrophilic surfactant, one or more monomers, one or more oligomers, and at least one photoinitiator;
   subsequently adding a hydrophilic surfactant solvent mixture to the surface of said partially cured optically clear polymer coating layer and inter-mingling said hydrophilic surfactant into the surface portion of said optically clear polymer layer and forming a hydrophilic surfactant rich surface portion; evaporating said solvent and
   curing said polymer coating layer containing said added hydrophilic surfactant; and
   wherein said hydrophilic surfactant rich surface portion has a surfactant concentration gradient thickness of from about 0.5 to about 3 microns and wherein the amount of said hydrophilic surfactant in said surfactant gradient is at least 80% by weight of the total hydrophilic surfactant with said optically clear, cured coating layer.

8. The process according to claim 7, wherein said transparent substrate is a thermoplastic;
   wherein said one or more monomers comprise acrylates or derivatives thereof;
   wherein said one or more oligomers have from about 4 to about 100 repeat units; and
   wherein said nanoparticles have a Moh hardness of about 6 or greater.

9. The process according to claim 8, wherein said one or more monomers comprise a difunctional acrylate or methacrylate having the formula $(CH_2=C(R)-COOR'-OOC-(R)C=CH_2)$, wherein R, independently, is a hydrogen or methyl group, R' is a linking group that has an alkyl group from 1 to 10 carbon atoms, or a polyoxyethylene group of 1 to 6 units, or a phenyl group, or cyclohexane group; or an acrylate or methacrylate ester or derivatives thereof comprising 1-6-hexanedioldi(meth)acrylate, 1,4-butanedioldi(meth)

acrylate, cyclohexane dimethanol di(meth)acrylate, diethylene glycol di(meth)acrylate, triethylene glycol di(meth)acrylate, tetraethylene glycol di(meth)acrylate, tripropylene glycol di(meth)acrylate; or any combination thereof;

the coating layer including said one or more oligomers comprising an aliphatic urethane acrylate oligomer, an aliphatic oligomer, a polyester acrylate oligomer, an epoxy acrylate oligomer, or a polyether acrylate oligomer, or any combination thereof, wherein the amount of said oligomers is from about 10 to about 40 parts by weight per 100 total parts by weight of said one or more monomers; and wherein said hydrophilic surfactant of said coating layer and said surface rich portion, independently, comprises one or more of polyethylene oxide or polypropylene oxide or a derivative thereof, an alkyl ether, an aromatic or an alkyl substituted aromatic ether, an organo-modified siloxane, an oligoethylene glycol-n-alkyl ether, a block copolymer of polyethylene oxide and polypropylene oxide, a polyoxyethylene isooctyl phenyl ether, a polyoxyethylene nonylphenyl ether, or a polyoxyethylenesorbitan fatty acid ester, or any combination thereof; and wherein said hydrophilic surfactant-solvent mixture contains from about 5% to about 40% by weight of said surfactant.

10. The process according to claim 9, wherein said transparent substrate comprises a polycarbonate, a polyacrylate, a polymethylmethacrylate, a polystyrene or a copolymer therefor, a polyolefin including a polypropylene, or a syndiotactic crystalline polypropylene, a polyester, a polyamide, a polyimide, or a polyurethane, or a copolymer of any of the preceding, or any combination thereof;

wherein said nanoparticle comprises alumina, zirconium oxide, zinc oxide, antimony oxide, or silica, or any combination thereof, wherein the amount of said nanoparticles is from about 1 to about 20 parts by weight for every 100 total parts by weight of said one or more monomers and said one or more oligomers;

wherein said photoinitiator is a compound that can generate free radicals and wherein the amount thereof is from about 1 to about 10 parts per every 100 total parts by weight of said one or monomers and said one or more oligomers; and the thickness of said optically clear, cured coating layer being from about 3 to about 25 microns.

11. The process according to claim 10, wherein said oligomers comprise said aliphatic oligomer, said urethane acrylate oligomer, or said polyether acrylate oligomer, or any combination thereof; and wherein said nanoparticle is silica, wherein said crosslinking agent comprises a trialkoxysilane, and wherein the amount of said crosslinking agent is from about 5 to about 50 parts by weight for every 100 parts by weight of said silica.

12. The process according to claim 11, wherein said transparent substrate comprises said polycarbonate or a copolymer thereof, a copolymer of polymethylmethacrylate, a copolymer of polyacrylate, a polyurethane or a polyurethane copolymer, or any combination thereof;

wherein said monomer is a triethyleneglycol diacrylate; and wherein said hydrophilic surfactant is a triblock copolymer of (polyethylene oxide)(polypropylene oxide)(polyethylene oxide); and wherein said hydrophilic surfactant rich surface portion has a surface concentration gradient thickness of from about 0.5 to about 1.0 micron and wherein the amount of said hydrophilic surfactant in said surfactant gradient is at least about 90% by weight of the total hydrophilic surfactant within said optically clear, cured coating layer.

13. The process according to claim 11, including reacting said abrasion-resistant nanoparticles with said crosslinking agent so that said crosslinking agent is grafted on to said nanoparticles; and wherein said hydrophilic-surfactant solvent mixture contains from about 10% to about 30% by weight of said surfactant;

evaporating said solvent of said hydrophilic surfactant solvent mixture before curing said polymer coating layer containing said added hydrophilic surfactant.

14. The process according to claim 7, including reacting said abrasion-resistant nanoparticles with said crosslinking agent so that said crosslinking agent is grafted on to said nanoparticles; and evaporating said solvent of said hydrophilic surfactant solvent mixture before curing said polymer coating layer containing said added hydrophilic surfactant.

* * * * *